United States Patent [19]

Musgrave

[11] 3,999,319

[45] Dec. 28, 1976

[54] DORMANT SPRING

[76] Inventor: Daniel D. Musgrave, 8201 Caraway St., Cabin John, Md. 20731

[22] Filed: Feb. 17, 1976

[21] Appl. No.: 658,681

[52] U.S. Cl. .................................. 42/50; 267/165
[51] Int. Cl.² ...................................... F41C 25/02
[58] Field of Search ............... 42/50, 49, 7, 18, 22; 267/158, 160, 164, 165, 85–87, 89

[56] References Cited

UNITED STATES PATENTS

| 1,893,098 | 1/1933 | Murray, Sr. et al. | 267/165 |
| 1,982,706 | 12/1934 | Teetor | 267/164 |
| 3,039,221 | 6/1962 | Musgrave | 42/50 |
| 3,373,521 | 3/1968 | Into | 42/50 |
| 3,395,479 | 8/1968 | Collins | 42/50 |
| 3,964,199 | 6/1976 | Musgrave | 42/50 |

*Primary Examiner*—Charles T. Jordan

[57] ABSTRACT

A spring for long-term installation in a limited space, in a minimum-stress condition. When thrust is desired, the position of some spring components is adjusted, resulting in a tendency for the spring to expand.

7 Claims, 10 Drawing Figures

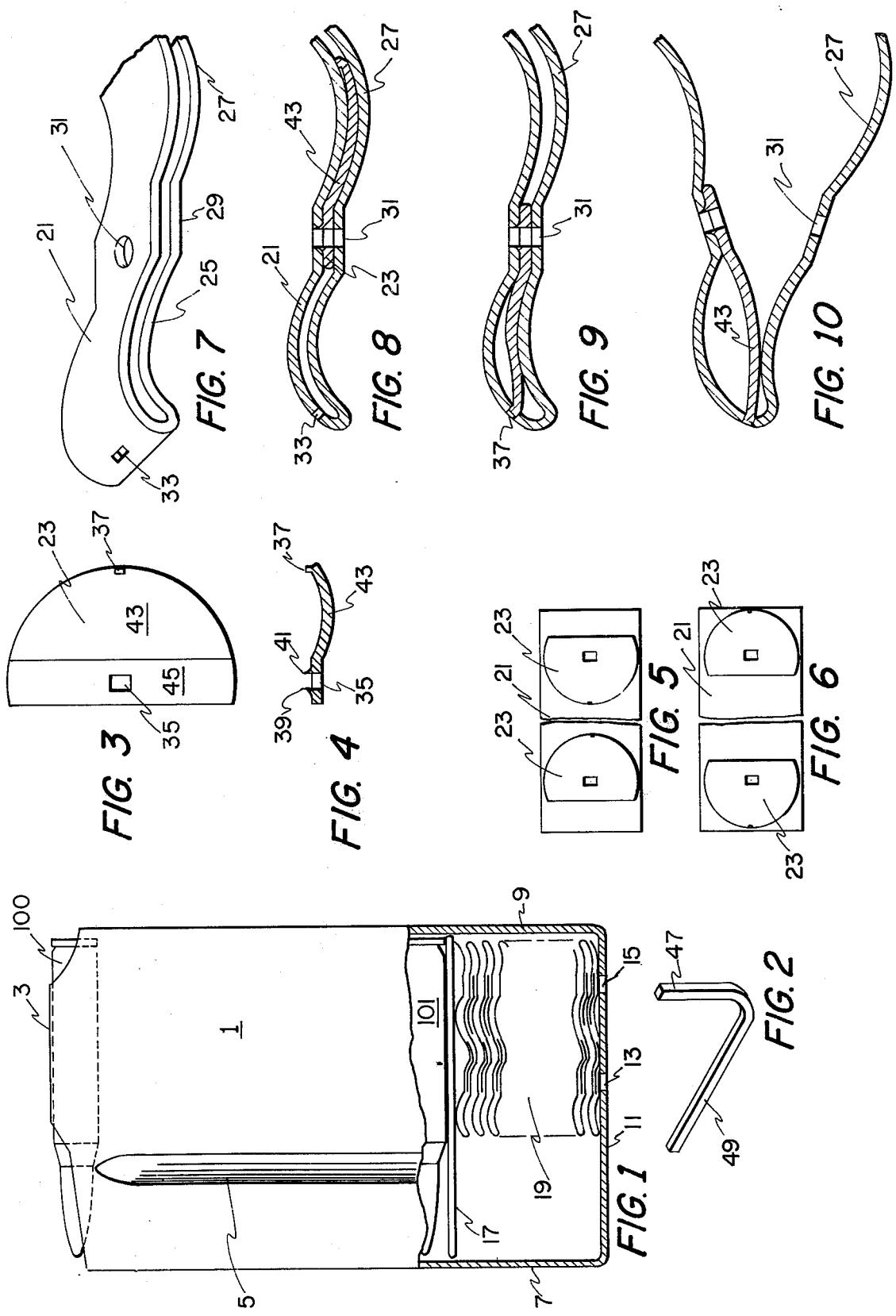

DORMANT SPRING

Many types of mechanical equipment include springs which must stand-by in a stressed condition for long periods of time. An obvious limitation on such springs is the possibility that resilience may be lost, thus rendering the mechanism inoperable.

An example of this problem is found in the ordinary cartridge magazine for firearms. For military use it would be desirable to fill the magazine with cartridges at a factory and issue it to the user in a protective wrapper. This cannot be done because of the limitation of time for keeping the magazine spring stressed. As a result, magazines and ammunition must be stored, shipped, and issued separately, an inefficient and inconvenient procedure.

The principal object of this invention is to provide a spring which can be installed in a minimum space, while in a minimal-stressed condition, and can be adjusted within the same space to a highly-stressed condition.

Another object of this invention is to provide such a spring which will be economical to fabricate.

These and other objects of the present invention will become apparent upon reference to the following specification, taken in connection with the accompanying drawings, wherein:

FIG. 1 is a side elevation, partly sectioned, of a cartridge magazine having a spring assembly which is an embodiment of the present invention.

FIG. 2 shows a tool for adjusting the spring assembly, as will be explained below.

FIG. 3 is a top view of an arc spring.

FIG. 4 is a section of the arc spring shown in FIG. 3.

FIGS. 5 and 6 are schematic views showing the orientation of the arc springs in the spring assembly, before, and after, stressing.

FIG. 7 is a partial perspective view of a folded leaf spring, in a non-stressed condition.

FIG. 8 is a section of the leaf spring shown in FIG. 7, with an arc spring inserted between the folds.

FIG. 9 is similar to FIG. 8 except that the arc spring has been adjusted to a different orientation relative to the leaf spring.

FIG. 10 is similar to FIG. 9 except that the leaf spring is expanded.

Referring to the drawings there is shown a cartridge magazine having a casing 1, the usual cartridge feed lips, one of which is shown at 3, and a groove 5 which guides the cartridges in the well-known manner. The casing has a typical front wall 7, rear wall 9, and bottom 11. Formed in bottom 11 are holes 13 and 15, the purpose of which will be explained later.

Within casing 1 is located movable platform 17 which acts against a column of cartridges in the well-known manner. The column is indicated by top cartridge 100 and botton cartridge 101. Positioned between platform 17 and botton 11 is spring assembly 19 which is an embodiment of the present invention. The spring assembly is only indicated in a general way in FIG. 1, details being shown in other figures.

Spring assembly 19 is composed of a folded leaf spring 21, a portion of which is shown in FIG. 7 and a plurality of arc springs 23, one of which is shown in FIGS. 3 and 4.

As shown in FIG. 7 the folded leaf spring has arcuate portions 25 and 27 separated by flat portions 29. In each flat portion 29 is formed a hole 31, and near each vertex of the folded spring is formed a slot 33 the purpose of which will be explained later. It will be noted that arcuate portions 25 and 27 are oriented oppositely.

As shown in FIGS. 3 and 4 arc spring 23 is approximately a semicircle when viewed from the top. At the center of the incomplete circle is located a square hole 35, the purpose of which will be explained later. On the circumference of the semicircle is located a lug 37, and a pair of lugs 39 and 41 are formed at the edge of hole 35. The arc spring consists generally of an arcuate portion 43 and flat portion 45 as may be noted in FIG. 4.

In FIG. 8 an arc spring 23 is installed between the leaves of leaf spring 21, with lugs 39 and 41 engaged in hole 31. It will be noted that arcuate portion 43 of spring 23 is oriented similarly to arcuate portion 27 of spring 21. This condition in spring assembly 19 of FIG. 1 is shown schematically in FIG. 5 which indicates that a spring 23 is positioned in each vertex, or fold, of spring 21. FIGS. 5 and 8 therefore show the assembly of the arc spring and the leaf spring in a condition wherein there is a minimum stress arising from the insertion of the arc springs between the leaves.

In FIG. 2 is shown a tool 47 having a square cross section dimensionally compatible with hole 35 in arc springs 23. The tool has a lever portion 49 for rotating the tool when a spring assembly is adjusted. In use, the tool is inserted through hole 13 or hole 15 in magazine casing 1, and through spring assembly 19 by way of holes 31 in the leaf spring and holes 35 in the arc springs. The tool is turned one half a revolution and the arc springs are thereby oriented as indicated schematically in FIG. 6. To reduce friction when turning, the leaf spring and the arc springs may be coated with a lubricant.

The resulting condition is shown in detail in FIG. 9 which shows that the arc spring, with its curvature opposed to that of the leaf spring, is now highly stressed.

It will also be noted in FIG. 9 that lug 37 has engaged hole 33 in the leaf spring. If the restraint on the leaf spring is removed, as by permitting platform 17 to rise, the spring assembly will extend somewhat as shown in FIG. 10, which of course shows only one vertex, while in actual practice a plurality might be employed as indicated in FIG. 1.

It should be noted that hole 33 serves not only as an engagement seat for lug 37, but also to reduce the cross-sectional area of leaf 21, thereby permitting it to bend easily.

There is thus disclosed a simple dormant spring which can be installed in a mechanical device for a long period of time without loss of resilience. When thrust is desired it can be activated by simple means in a minimum time.

(In the above specification the term "spring assembly" means the leaf spring with the arc springs inserted. To better indicate the purpose of the invention, the spring assembly has been given the name "Dormant Spring".)

It is desired to point out that the disclosed embodiment is exemplary only, and should not be considered limiting.

What I claim is:

1. A dormant folded spring comprising: a vertex; nested arcuate portions adjacent to said vertex on resilient leaves extending from said vertex; and arcuate wedge means adapted for positioning between said arcuate portions with the arcs of said wedge means and the arcs of said arcuate portions oppositely oriented thereby tending to separate said leaves and unfold said spring.

2. A dormant spring as set forth in claim 1 further characterized by said wedge means being resilient.

3. A dormant spring as set forth in claim 1 further characterized by the cross sectional area of said leaves being reduced at said vertex.

4. A dormant spring as set forth in claim 1 further characterized by detent means for retaining said wedge means in a position whereat said wedge means tends to separate said leaves.

5. A dormant spring as set forth in claim 1 further characterized by said wedge means also being adapted for nesting between said leaves with said arcs of said wedge means and said arcs of said arcuate portions similarly oriented.

6. A dormant spring as set forth in claim 1 further characterized by said leaves and said wedge means being coated with a substance having a low coefficient of friction.

7. A cartridge magazine for a firearm comprising: a case for storing a stack of cartridges, said case having an exit port with at least one feed lip; a follower adapted for urging said stack toward said port; a dormant folded spring engaging said follower and reacting against said case and comprising: at least one vertex; nested arcuate portions adjacent to said vertex on resilient leaves extending from said vertex; and arcuate wedge means adapted for positioning between said arcuate portions with the arcs of said wedge means and the arcs of said arcuate portions oppositely oriented thereby tending to separate said leaves and unfold said spring.

* * * * *